United States Patent
Mohrs

(10) Patent No.: US 6,741,852 B1
(45) Date of Patent: May 25, 2004

(54) METHOD AND DEVICE TO AUTHENTICATE SUBSCRIBERS IN A MOBILE RADIOTELEPHONE SYSTEMS

(75) Inventor: Walter Mohrs, Bonn (DE)

(73) Assignee: DeTeMobil Deutsche Telekom MobilNet GmbH, Bonn (DE)

( * ) Notice: Subject to any disclaimer, the term of this patent is extended or adjusted under 35 U.S.C. 154(b) by 0 days.

(21) Appl. No.: 09/423,174
(22) PCT Filed: May 5, 1998
(86) PCT No.: PCT/DE98/01232
§ 371 (c)(1), (2), (4) Date: Apr. 3, 2000
(87) PCT Pub. No.: WO98/51112
PCT Pub. Date: Nov. 12, 1998

(30) Foreign Application Priority Data

May 5, 1997 (DE) .......................... 197 18 827

(51) Int. Cl.⁷ .................... H04M 1/66; H04M 1/68; H04M 3/16
(52) U.S. Cl. .................... 455/411; 455/410; 455/558
(58) Field of Search .................... 455/411, 410, 455/558, 426, 462; 380/247, 248; 379/357

(56) References Cited

U.S. PATENT DOCUMENTS 5,301,234 A * 4/1994 Mazziotto et al. .......... 380/247
5,557,654 A * 9/1996 Maenpaa .................... 455/411
5,991,407 A * 11/1999 Murto ........................ 380/248

FOREIGN PATENT DOCUMENTS

DE 195 25 276 C1 7/1995

OTHER PUBLICATIONS

Jacek Biala, "Mobilfunk und Intelligente Netze." Braunschweig / Wiesbaden: Vieweg–Verlag, 1994, pp. 190–192.
DECT Publication, DIN ETS 300175–T7, 1993, Annex G, pp. 98–100.

* cited by examiner

Primary Examiner—Vivian Chin
Assistant Examiner—L West
(74) Attorney, Agent, or Firm—Myron Greenspan, Esq.; Lackenbach Siegel LLP

(57) ABSTRACT

A method and device is able to authenticate a subscriber of a digital mobile radiotelephone system vis-à-vis an authentication entity, wherein the subscriber firstly initializes vis-`a-vis the authentication entity by executing several times the authentication algorithm containing stored subscriber-specific components and by storing the corresponding response parameters of the subscriber-specific components in a non-volatile memory. Systematic authentication of the subscriber of the mobile radiotelephone system vis-à-vis the authentication entity via a common interface is made possible by the authentication parameters stored in the memory since the authentication entity can always refer back to the response parameters of the individual subscriber module it already knows.

23 Claims, 2 Drawing Sheets

METHOD AND DEVICE TO AUTHENTICATE SUBSCRIBERS IN A MOBILE RADIOTELEPHONE SYSTEMS

BACKGROUND OF THE INVENTION

1. Field of the Invention

The invention concerns a procedure and a device for authenticating mobile telephone subscribers of a digital mobile communications system against an authentication entity, and for determining the correct encryption key required for an encoded voice and/or data transmission.

2. Description of the Prior Art

The background of the invention is the capability which is currently being investigated and developed of coupling a mobile telephone network with a cordless telephone system (HBS: Home Base System). Future mobile stations can then be operated not only alone in the mobile telephone network, but also in the home area in conjunction with a cordless telephone system, as a sort of "super cordless telephone." An important condition for doing this is to find a way that the authentication and voice/data encryption algorithms which are used in the mobile telephone network can also be used in the home area, in conjunction with the cordless system.

For system security, GSM mobile communications systems use several encryption algorithms (A3, A5, and A8) to authenticate subscribers against the network and to encrypt data transmission. To do this, each time a connection is established between the network and a subscriber the authentication center transmits a random number (RAND) over the radio interface to the subscriber's personal component (SIM card) which both the SIM and the authentication center encrypt to a value SRES using the encryption algorithms with a Ki key which is identical in both of them. The SRES value determined in the SIM is transmitted to the authentication center, and is compared with the SRES value determined there. The subscriber is positively authenticated only if the two independently determined values coincide.

Now, if is desired to apply this authentication procedure to a cordless telephone system, then this would mean that the fixed station of the cordless telephone system would have to implement the necessary encryption algorithm and that it would have to have the secret Ki key stored in it. The mobile telephone network operator would find this untenable for security reasons alone, and it would also involve great technical and administrative expense.

SUMMARY OF THE INVENTION

Therefore, this invention is based on the task of specifying a procedure and a device for authenticating mobile telephone subscribers against an authentication entity and for determining the correct encryption key required for an encoded voice and/or data transmission, which is simple and cost-effective to implement and which provides good security.

To solve this task, a procedure having the features of claim 1 and a device having the features of claims 9 and 10 are specified.

An essential advantage of the invention is that the device for determining the authentication and encoding parameters
  neither requires a connection with the authentication center of the mobile telephone network (e.g., to the MSC),
  nor does it have to contain a special smart card which has, among other things, the authentication algorithm used in the mobile telephone network (for GSM: A3/A8) and secret data (Ki) of the mobile telephone subscriber to be authenticated.

This invention obviates the need to make the authentication algorithm available on the part of the authentication entity of a cordless telephone system and the need to have coordinated keys (Ki) in the cordless telephone system and the SIM.

Another advantage is that the cordless telephone system, especially the fixed station (HBS), requires only slight modifications to be able to perform the functions required of an authentication entity.

This is accomplished by giving the cordless telephone system the ability to execute both the authentication algorithm of the smart card used (SIM: Subscriber Identity Module) and also giving it at least one secret key coordinated with the SIM. If the cordless telephone system meets these two requirements, it is capable of performing an authentication procedure with a logging-on SIM according to the challenge/response procedure which is identical to that which is used in digital mobile telephone networks, especially GSM.

BRIEF DESCRIPTION OF THE DRAWINGS

More details and features of the invention are revealed in the following description of an embodiment, which makes use of the drawings. The drawings are as follows.

DESCRIPTION OF THE INVENTION

Figure 1:
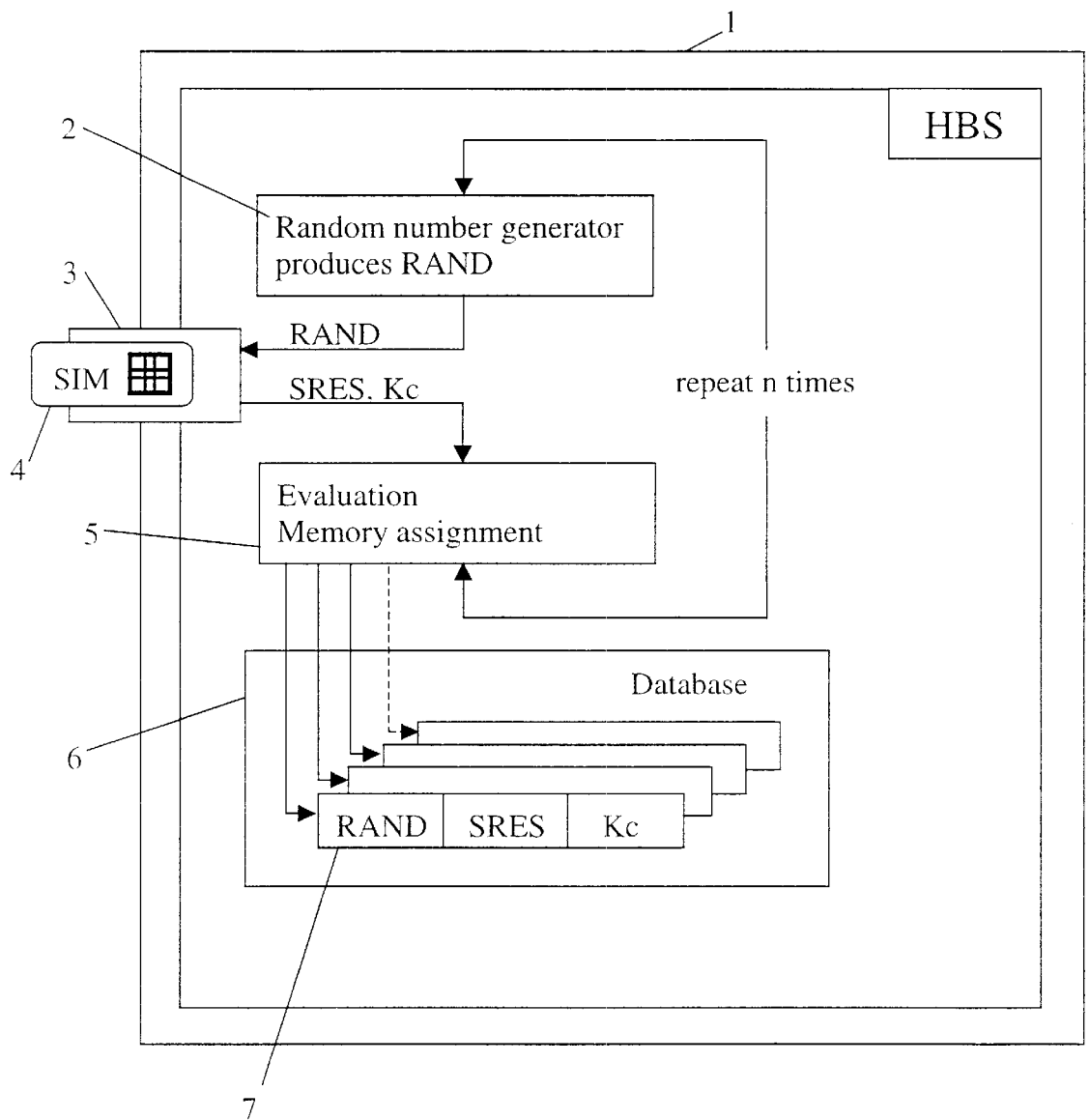
FIG. 1 is a block diagram of the system according to the invention showing the initialization of the fixed station of a cordless telephone system for an SIM card.

The invention starts from a known cordless telephone system, which preferably works according to the digital DECT standard.

In a first embodiment, the fixed station of the cordless telephone system is equipped with a card reading device which can read and write common smart cards (SIM cards). Moreover, the fixed station has a random number generator which can produce the 128-bit random numbers used in the GSM system.

The fixed station is also provided with a non-volatile memory which preferably has a storage capacity of several kilobytes.

For authentication, the fixed station of the cordless telephone system sends a random value (RAND) to the subscriber's SIM card, which the SIM card answers, in a manner known in the art, with a response value (SRES). Simultaneously, this procedure processes a key (Kc) for a subsequent voice encryption, which is also determined using the random number. Ideally, the part of the cordless telephone system which is used as the carrier of the algorithm and the key is the SIM card of the respective mobile telephone subscriber who wishes to use the cordless telephone system.

An initialization process which acquaints a subscriber's SIM card and the cordless telephone system with one another, and which has to take place in any case, involves the subscriber inserting his SIM card into the reader of the fixed station of the cordless telephone system. Not only does the SIM card communicate its ID (card number or IMSI) to the fixed station of the cordless telephone system, which would really suffice for acquainting the two, but the fixed station then also performs a certain rather large number of internal authentication procedures. In the process the fixed station produces a random number (RAND) and transfers it to the SIM card. The SIM card now performs the GSM procedure "RUN GSM ALGORITHM" which is implemented on it, i.e., the SIM card takes the random number and determines from it, in a manner known in the art, an encrypted value SRES and an encryption key Kc, and turns these values over to the fixed station. After that, the fixed station stores the results it has obtained, along with the associated random number, in a non-volatile memory. As was mentioned above, the internal authentication process is repeated several times. Practically speaking, the values obtained form a reserve which can subsequently be used to perform "regular" authentications with the SIM card through the radio interface.

Thus, an internal authentication is the same process which each mobile station performs with its SIM if an "authentication request" is transmitted through this radio interface of the GSM network, in particular:

transfer of a random number (RAND) to the SIM;

execution of the GSM command "RUN GSM ALGORITHM";

retrieval of the SIM's response data, which corresponds to the SRES and the Kc.

Each time these three steps are performed, the fixed station produces a so-called authentication triplet (RAND, SRES, Kc), which later makes possible an authentication with the SIM.

The triplets stored in the fixed station of the cordless telephone system now make it possible to perform a regular authentication between fixed station and a mobile station which, following the GSM authentication procedure, takes place as follows.

Every time a connection is established, the fixed station sends a random number (RAND) from the reserve of previously stored triplets through the radio interface to the SIM card. The SIM card uses this random number to calculate a corresponding response value SRES and a key Kc. The SRES value is sent back to the fixed station and compared with the stored SRES value of the triplet associated with the random number. If the SRES values coincide, then the authentication is successful, and it is assured that the encryption key Kc calculated in the SIM card coincides with the associated key Kc stored in the fixed station.

In another embodiment, the fixed station of the cordless telephone system is not equipped with a card reading device, but rather performs the internal initialization through a wire-bound interface (e.g., X.25, RS-232, etc.) or through the existing radio interface. Especially when the initialization data is transmitted over the radio interface, care should be taken to provide security from eavesdropping, i.e., the transmitted initialization data should be transmitted in encrypted form.

It is simple for this initialization, i.e., the production of more triplets, to take place during a regular connection between a mobile station and a fixed station, since the data is already transmitted in encrypted form during a regular connection. It is only necessary to start the initialization by pressing an appropriate button on the mobile station or issuing an appropriate command.

It is important for the production of the triplets to take place in a secure environment which is not subject to eavesdropping from outside (namely, directly through an SIM/station interface using contacts or through an encrypted radio interface). It is also important for the triplets to be stored in the fixed station of the cordless telephone system in a protected, unreadable system environment. It should not be forgotten that the quality of random number production in the fixed station represents a security risk which is not negligible.

The time which is provided for the initialization and the storage capacity of the fixed station determine how many triplets are produced ahead of time. It can be assumed that a typical SIM card can produce 2–3 triplets/second. The storage required for a triplet is 28 bytes (RAND=128 bits, SRES=32 bits, Kc=64 bits). For example, given an initialization time of 1 minute, triplets can be produced for the next 120–180 authentications, which require a storage volume of 3–5 kB.

If the reserve of triplets is used up, it can be decided whether a new initialization is necessary immediately, or whether the HBS may once again access triplets which have already been used. In the latter case, the HBS should notify the user that the triplets are already being reused, and that a new initialization is necessary.

The reserve of triplets in the HBS should be card-specific, that is linked with the card number or IMSI of the SIM. This makes it possible for several SIMs to work simultaneously on the same HBS. Each of the SIMs used only has to undergo the same initialization process described above. The individual IMSIs stored on the SIM cards are used to store the corresponding triplets in a database assigned to the IMSI, and to select them from it.

If sufficient storage capacity is provided in the HBS, a triplet reserve can be produced which is large enough that reuse of the triplets is only necessary after a long period of time; and even a reuse of the triplets, if it is done in random order, provides enough unpredictability to ensure a high level of security.

To protect against fraud and misuse, the HBS can have a mechanism which discards the stored triplets and withdraws the right to use the HBS from the logged-on subscriber if repeated unsuccessful authentications occur.

FIG. 1 schematically shows how the authentication triplets are produced and stored in fixed station 1 of the cordless telephone system.

The fixed station 1 has a device 3 for reading and writing smart cards 4, into which the subscriber inserts his SIM card 4 to initialize a subscriber relationship. A random number generator now produces, in a manner known in the art, a 128-bit random number (RAND), which is transferred to the SIM card.

The SIM card starts the authentication algorithm stored in it, i.e. it uses the random number (RAND) to determine an encoded number SRES and an encryption key Kc, both of which are transferred to an evaluation device 5 in the fixed station 1. The transferred values are stored, along with the random number, in a non-volatile manner in a database 6. This internal initialization process is repeated several times and the corresponding records 7 are stored in the database 6 in the form of authentication triplets (RAND, SRES, Kc).

Figure 2:
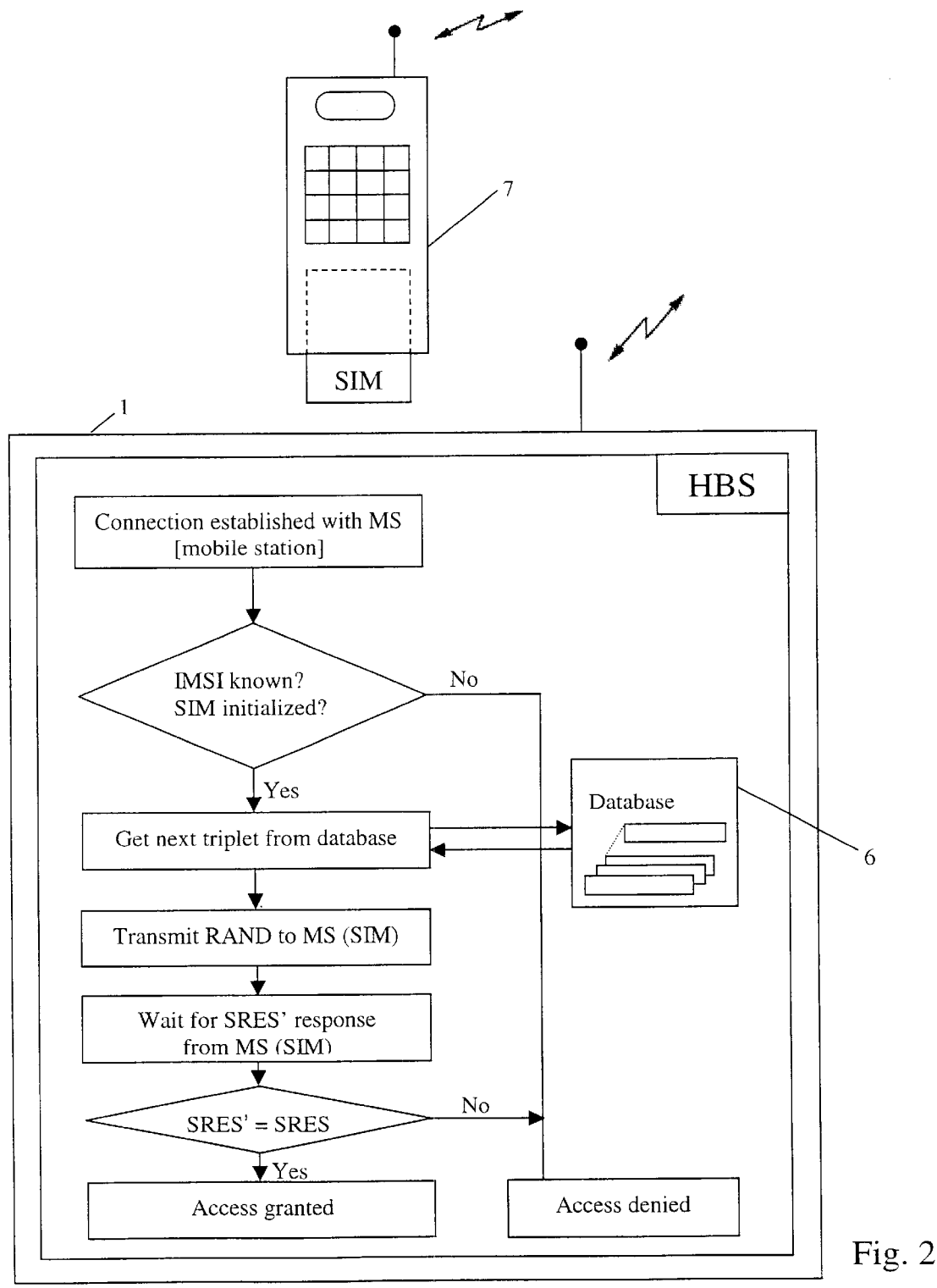
FIG. 2 is a flow chart illustrating the authentication with an initialized SIM card.

The database now has initialization triplets stored in it which can subsequently be used for regular authentication between the mobile station and the fixed station. FIG. 2 shows the sequence of functions which the fixed station performs during real authentication.

A mobile station 8 wants to logon with the fixed station 1. This involves personalizing the mobile station with an SIM card which has previously been initialized at fixed station 1. First, a connection is established between the mobile station 8 and fixed station 1 over the radio interface.

The IMSI on the SIM card is transmitted to fixed station 1, which checks whether it knows the IMSI, that is, whether the SIM card has already been initialized. If this is not the case, access to the fixed station is denied, and the connection is dropped.

If the SIM card is known, fixed station 1 accesses the database 6, retrieves the next authentication triplet 7, and transmits the random number (RAND) contained in this triplet to the SIM card. The SIM card uses the random number to determine a response SRES', and transmits it back to fixed station 1. The fixed station compares the value SRES' with the SRES value in the currently selected triplet of the fixed station. Only if the two values SRES' and SRES coincide is the mobile station with precisely this SIM card granted access to the fixed station and allowed to communicate through it.

If the SRES values do not coincide, then the fixed station denies access.

What is claimed is:

1. Procedure for authenticating a subscriber of a digital mobile communications system against an authentication entity in a cordless telephone system, characterized by the following steps:
   an initialization of the subscriber with the authentication entity in the cordless telephone system involving:
   a) a random number being produced by the authentication entity;
   b) the random number being transmitted to a subscriber-specific component of a mobile station;
   c) response data determined by the subscriber-specific component using the random number;
   d) storing the random number with the associated response data in the form of authentication values in a non-volatile memory in the authentication entity; and
   e) repetition of steps a)–d) several times; and
   regular authentication of the mobile telephone subscriber against the authentication entity over a common radio interface using the authentication values.

2. Procedure according to claim 1, characterized by the fact that the regular authentication comprises the following steps:
   reading an authentication triplet from the memory in the authentication entity;
   transferring the random number of the authentication triplet which was read to the subscriber-specific component of the mobile station;
   retrieval from the subscriber-specific component of a response parameter SRES' determined from the random number;
   comparison of the response parameter SRES' with the corresponding value SRES contained in the authentication values; and
   if the values SRES' and SRES coincide, the mobile telephone subscriber being granted access to communicate through a digital communications system assigned to the authentication entity.

3. Procedure according to claim 1, characterized by the fact that, if the response values SRES' and SRES do not match, access is denied to the mobile telephone subscriber.

4. Procedure according to claim 2, characterized by the fact that, if the response values SRES' and SRES do not match, access is denied to the mobile telephone subscriber.

5. Procedure according to claim 1, wherein the subscriber-specific component is initialized by being connected with a corresponding reading/writing device in the authentication entity.

6. Procedure according to claim 2, wherein the subscriber-specific component is initialized by being connected with a corresponding reading/writing device in the authentication entity.

7. Procedure according to claim 3, wherein the subscriber-specific component is initialized by being connected with a corresponding reading/writing device in the authentication entity.

8. Procedure according to claim 1, characterized by the fact that during the initialization process the exchange of data between the subscriber-specific component and the authentication entity takes place through wires.

9. Procedure according to claim 2, characterized by the fact that during the initialization process the exchange of data between the subscriber-specific component and the authentication entity takes place through wires.

10. Procedure according to claim 3, characterized by the fact that during the initialization process the exchange of data between the subscriber-specific component and the authentication entity takes place through wires.

11. Procedure according to claim 5, characterized by the fact that during the initialization process the exchange of data between the subscriber-specific component and the authentication entity takes place through wires.

12. Procedure according to claim 1, characterized by the fact that during the initialization process the exchange of data between the subscriber-specific component and the authentication entity is wireless.

13. Procedure according to claim 2, characterized by the fact that during the initialization process the exchange of data between the subscriber-specific component and the authentication entity is wireless.

14. Procedure according to claim 3, characterized by the fact that during the initialization process the exchange of data between the subscriber-specific component and the authentication entity is wireless.

15. Procedure according to claim 5, characterized by the fact that during the initialization process the exchange of data between the subscriber-specific component and the authentication entity is wireless.

16. Procedure according to claim 1, characterized by the fact that if the authentication values stored in the authentication entity are used up, a new initialization process is started.

17. Procedure according to claim 1, characterized by the fact that the authentication entity can manage the data of several subscribers and subscriber-specific authentication values.

18. Device for accomplishing the procedure according to claim 1 characterized by:
   the authentication entity being a fixed component of a second digital communications system;
   a reading/writing device for reading/writing the data contained on the subscriber-specific component being integrated in the authentication entity or connected with it;
   a random number generator being provided in the authentication entity to produce a random number; and
   a non-volatile memory being provided in the authentication entity.

19. Device according to claim 18, characterized by the fact that the authentication entity is a component of a fixed station of a digital cordless telephone system.

20. Device according to claim 18, characterized by the fact that the digital mobile telephone communication network is a GSM mobile communications network.

21. Device according to claim 19, characterized by the fact that the digital mobile telephone communication network is a GSM mobile communications network.

22. Device according to claim 18, characterized by the fact that the subscriber-specific component is an SIM card.

23. Device according to claim 19, characterized by the fact that the subscriber-specific component is an SIM card.

* * * * *